United States Patent
Senninger

(10) Patent No.: US 6,723,812 B2
(45) Date of Patent: Apr. 20, 2004

(54) PROCESS FOR THE HIGH-PRESSURE POLYMERIZATION OF 1,1-DIFLUOROETHYLENE

(75) Inventor: Thierry Senninger, Hayange (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/963,892

(22) Filed: Sep. 26, 2001

(65) Prior Publication Data
US 2002/0123585 A1 Sep. 5, 2002

(30) Foreign Application Priority Data
Sep. 26, 2000 (FR) .............................. 00 12191

(51) Int. Cl.$^7$ ............................. C08F 114/18
(52) U.S. Cl. .................. 526/255; 526/247; 526/253; 526/254
(58) Field of Search .................. 256/255, 247, 256/253, 254

(56) References Cited

U.S. PATENT DOCUMENTS 2,435,537 A * 2/1948 Ford
3,987,117 A 10/1976 Englander et al.
4,855,523 A * 8/1989 Stevens ................ 585/511
4,859,757 A * 8/1989 Pellon .................. 526/348
5,583,190 A 12/1996 Brinati et al.

FOREIGN PATENT DOCUMENTS

DE 0 411 990 A1 2/1991
GB 2 184 737 7/1987

* cited by examiner

*Primary Examiner*—Bernard Lipman
(74) *Attorney, Agent, or Firm*—Millen, White, Zelano & Branigan, P.C.

(57) ABSTRACT

The invention relates to a continuous process for the manufacture of PVDF homopolymer or copolymer. The optional comonomer comprises a vinyl group polymerized by free radicals, and comprises at least one fluorine atom, a fluoroalkyl group or a fluoroalkoxy group, directly attached to this vinyl group. The invention also relates to PVDF homopolymers made by processes of the invention. The invention further relates to a process for deoxygenating a flow.

19 Claims, No Drawings

PROCESS FOR THE HIGH-PRESSURE POLYMERIZATION OF 1,1-DIFLUOROETHYLENE

FIELD OF THE INVENTION

The present invention relates to a continuous process for the high-pressure polymerization of 1,1-difluoroethylene (VF2) to give polyvinylidene fluoride (PVDF).

BACKGROUND OF THE INVENTION

The polymerization of 1,1-difluoroethylene is currently carried out industrially in an aqueous medium either in emulsion or in suspension. This type of polymerization thus corresponds to batchwise processes.

In the case of the emulsion, it is necessary to add emulsifiers to the polymerization medium in order to stabilize the PVDF latex particles formed. The emulsifiers must be removed in a subsequent step in order to ensure that the polymer is in a suitable purity. Furthermore, certain emulsifiers which are used in the emulsion process are perfluoro molecules. Studies have shown that these molecules have a tendency to accumulate in aquatic flora. Although considered as harmless, nothing is as yet known regarding the long-term impact of this bioaccumulation.

In the case of the suspension, protective colloids are incorporated in order to stabilize the PVDF particles.

Another process is currently under investigation in many laboratories. This continuous process differs from emulsion/suspension processes in that it is carried out in supercritical $CO_2$ ($ScCO_2$) without stabilizing additive. During the polymerization, the PVDF which is insoluble in the $ScCO_2$ precipitates and forms a powder. However, it is necessary to add a powder-treatment step in order to convert it into PVDF granules since this type of process does not make it possible to obtain a powder of controlled and narrow particle size (as with the emulsion process).

Patent FR-A-1 260 852 discloses the polymerization of VF2 under pressure either in the presence of a neutral reaction medium such as water or in the absence of a reaction medium. According to the first form, deionized and deoxygenated water are loaded into an autoclave, followed by a peroxide and VF2, the proportion of peroxide being 0.8 g per 35 g of VF2. The autoclave is closed and heated, the pressure establishes at values of about 40 to 60 bar, and the reaction time is about 18 hours. Next, the autoclave is cooled and PVDF is recovered therefrom. According to the second form, the process is performed as in the first form, but without introducing water, the pressure and the reaction time being the same. It is stated that this second form lends itself to a continuous operation in which the autoclave is connected to a source of VF2 under pressure such that the fresh VF2 enters the autoclave when the conversion into polymer takes place. According to a variant, catalyst may be added continuously or in batchwise mode. This prior art is based on a fatal pressure (autogenous pressure) generated by the volume of the autoclave, the reagents loaded in and the temperature. The fact that it can be made continuous by injecting fresh VF2 to compensate for the VF2 which is polymerized has nothing to do with a process in which the reaction pressure is determined by the pressure supplied by the VF2 injection pumps. Nothing is stated regarding the oxygen content of the VF2.

Patent U.S. Pat. No. 2,435,537 discloses a process similar to the previous one but still in the presence of water, 50 parts per 40 parts of VF2, and the pressure may be 1000 bar. All the examples are in batchwise mode in an autoclave. It is stated that the process may be performed continuously; however, it is recommended always to use an inert medium such as water to disperse the catalyst and control the reaction by dissipating the heat. It is stated that oxygen has a harmful effect on the polymerization, but the oxygen content of VF2 is not specified and nothing is stated regarding the means for reducing it.

Patents FR-A-2 650 593 and FR-A-2 689 134 disclose processes for the high-pressure synthesis either of copolymers of VF2 and of ethylene or copolymers of VF2 and of fluoroacrylates.

Patent WO 98/28351 discloses the continuous polymerization of VF2 in supercritical $CO_2$ (75° C.—276 bar). PVDF copolymers may thus be manufactured. In one example, the flow rate of fluoro monomers is 200 g/h for a $CO_2$ flow rate of 518 g/h.

SUMMARY OF THE INVENTION

A high-pressure process exists, in which the VF2 is converted into PVDF solely under the effect of pressure and traces of a peroxide. The high-pressure polymerization makes it possible to overcome the problems mentioned in the other processes cited above:

- the process does not require stabilizing additives (protective colloids or surfactants),
- no treatment of the powders.

Another advantage of the high-pressure process is that it offers better production efficiencies than the continuous process in $ScCO_2$.

The present invention relates to a process of this type. Particularly, a continuous process for preparing PVDF homopolymer or copolymer has now been found, the comonomer being a fluoro monomer rather than an acrylate, in which no organic solvent or water is used and which is not in $ScCO_2$ medium.

The invention is a continuous process for the manufacture of PVDF homopolymer or copolymer, the comonomer being chosen from compounds containing a vinyl group capable of being opened by the action of free radicals in order to polymerize, and which contains, directly attached to this vinyl group, at least one fluorine atom, a fluoroalkyl group or a fluoroalkoxy group in which:

(a) a flow of VF2, of optional comonomer and of radical initiator is introduced into a reactor maintained at a pressure of between 300 bar and 3000 bar, the reactor containing essentially VF2, an optional comonomer and PVDF;

(b) a flow of reaction mixture is removed from the reactor for step (a) and introduced into a separator;

(c) molten PVDF is recovered in the separator and purged continuously;

(c1) the flow of PVDF from step (c) is optionally introduced into a device to place it in the form of granules;

(d) VF2 and optionally comonomer are recovered in the separator and recycled into step (a).

According to one advantageous form of the invention, the fresh VF2, the other portion being recycled, which is introduced into step (a) contains less than 5 ppm of oxygen, preferably less than 1 ppm and better still between 0.1 and 0.8 ppm.

The process of the invention advantageously comprises an additional step consisting in deoxygenating the fresh VF2 before introducing it into step (a).

This step consists in placing the flow of VF2 in contact with (i) a sufficient amount of a catalyst whose active sites are elements belonging to groups 8 to 11 of the Periodic Table of the Elements and (ii) for a time which is sufficient to obtain the desired oxygen content.

The invention also relates to this isolated step of treatment of VF2 to reduce its oxygen content. This step advantageously precedes a process which is different from the preceding one in which the VF2 is polymerized or copolymerized.

This deoxygenation may also apply to mixtures of VF2 and of one or more comonomers and also to the VF2 comonomers alone.

The invention also relates to, as a product, VF2, the mixture of VF2 and of comonomer or the comonomer alone (or mixture of comonomers) containing less than 5 ppm of oxygen, advantageously less than 1 ppm and better still between 0.1 and 0.8 ppm.

The present invention also relates to a PVDF with an Mw/Mn ratio of between 1.5 and 1.9.

The process of the invention has many advantages:
there is no water or organic solvent: it is a clean process, not requiring the recycling/treatment of water or the recycling of solvent;
it is a <<dry>> process not requiring the removal of water or solvent from the polymer: it is less expensive in energy terms;
the polymer is cleaner since it is not soiled by the presence of surfactants or other additives;
there is no use of perfluoro surfactants which may bioaccumulate in the environment: the process is environmentally friendly;
there is no handling of powder as in the $ScCO_2$ process: this entails a simplification of the process, with no cyclones to be added, no step of uptake of the powder to convert it into granules, no problem of powder explosion and no problem of electrostatics;
the production efficiencies are better than in the $ScCO_2$ process (as demonstrated in Example 1).

As regards the proportions of VF2 and of comonomer in the PVDF and thus the proportions of fresh VF2 and of fresh comonomer introduced into step (a), the proportion by weight of comonomer is advantageously between 0 and 50% and preferably between 0 and 30%.

Examples of comonomers which may be mentioned are vinyl fluoride; trifluoroethylene; chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro (ethyl vinyl) ether (PEVE) and perfluoro(propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2-trifluoromethyl-3,3,3-trifluoro-1-propene. Several comonomers may be used.

The reactor contains at least 90% by weight of VF2, one (or more) optional comonomer and PVDF. There is no organic solvent, water or $ScCO_2$.

The reactor pressure is advantageously between 500 and 3000 bar and preferably between 1500 and 2500 bar. The reactor has a volume such that the residence time is advantageously between 1 min and 1 h.

As regards the radical initiator, the product is known per se. Suitable radical initiators which may be used comprise tert-butyl perpivalate, t-butyl hydroperoxide, cumene hydroperoxide, diisopropylbenzene hydroperoxide, di-t-butyl peroxide, t-butylcumyl peroxide, dicumyl peroxide, 1,3-bis(t-butylperoxyisopropyl)benzene, acetyl peroxide, benzoyl peroxide, isobutyryl peroxide, bis(3,5,5-trimethyl) hexanoyl peroxide and methyl ethyl ketone peroxide. The initiator may be dissolved in a solvent; examples which may be mentioned are heptane and isododecane.

The flow rate of initiator is advantageously between 2 ppm and 1000 ppm by weight relative to the flow rate of fresh VF2 or of the fresh VF2 and fresh comonomer together, and preferably between 2 ppm and 100 ppm.

The flow rate of VF2 and of optional comonomer is adjusted to compensate for the production of PVDF, and the temperature is adjusted by the reactor-cooling system. The flow rate of initiator is adjusted to obtain a conversion of the monomers into PVDF. The temperature is advantageously maintained between 50° C. and 300° C. and preferably between 90° C. and 220° C. The advantage of working at a temperature above 150° C. to obtain low crystallinity is explained later.

The apparatus used can be the same as that in which the synthesis of low-density polyethylene (LDPE) is carried out. This apparatus is known.

The autoclave and tubular processes both form part of the so-called "high-pressure" polymerization processes and a person skilled in the art immediately knows what it involves. These two processes involve the high-pressure radical-mediated polymerization of ethylene, at pressures generally of between 100 MPa and 350 MPa and at temperatures above the melting point of the polyethylene being formed. The tubular process involves the polymerization in a tubular reactor. A tubular reactor comprises cylinders whose inside diameter is generally between 1 cm and 10 cm and whose length is generally from 0.1 km to 3 km. In a tubular reactor, the reaction medium is driven at high linear speed, generally of greater than 2 meters per second and short reaction times, which may be, for example, between 0.1 min and 5 min.

The pressure in a tubular reactor may be, for example, between 200 MPa and 350 MPa.

The autoclave process involves polymerization in an autoclave whose length/diameter ratio generally ranges from 1 to 25 in the case of a single-zone reactor. In the case of a multiple-zone reactor, the ratio of the length of each zone to the diameter generally ranges from 0.5 to 6, it being understood that the reaction medium flows in the direction of the length. The pressure in an autoclave reactor may be, for example, between 100 MPa and 250 MPa.

It would not constitute a departure from the context of the invention to add to the reactor or at the outlet a product for promoting flow. By way of example, this product may be supercritical $CO_2$, but this has nothing to do with a polymerization in $ScCO_2$. Specifically, the amount added is from about 0 to 10% by weight relative to the mass of fluoro monomers and of PVDF contained in the reactor.

As regards the oxygen content of the VF2, it is generally known that the presence of oxygen may have an appreciable influence on radical-mediated polymerizations, whether they are carried out in emulsion, suspension or bulk, at low pressure (P<500 bar) or at high pressure (P>500 bar). Specifically, the oxygen participates in the radical-mediated processes and can act either as initiator or as polymerization inhibitor. Reference may be made to *Chemical Reviews*

1991, 91 (2), 99–117 for further details regarding the exact mechanisms involving the $O_2$ species. However, it was not known that VF2 contained amounts of oxygen which could impair its polymerization, whichever process is used.

For example, when $VF_2$ is manufactured by a process of cracking 1-chloro-1,1-difluoroethane:

$$CH_3\text{—}CF_2Cl \rightarrow HCl + VF_2$$

This process does not make it possible to obtain $VF_2$ containing less than 5 ppm of residual oxygen. Generally, the $VF_2$ obtained from this process contains between 10 ppm and 15 ppm of oxygen, which is much too high for polymerization, in particular at high pressure. It is thus desirable to have available a simple and economical single operation for removing the residual oxygen in the $VF_2$ and possibly in the comonomers.

The catalyst used is a solid catalyst composed of active sites dispersed on a mineral support, optionally containing promoters whose role is to increase the chemical activity of the catalyst. The active sites are elements belonging to groups 8–11 of the Periodic Table.

The solid catalyst is in the form of granules of varied shapes (cylinders, flakes, beads, etc.). The support for the active sites is preferably mineral. It may be alumina, silica, zeolite or aluminosilicate or any other support known to those skilled in the art of heterogeneous catalysis. The catalyst contains between 0.05% and 5% by weight of the active element.

In order to ensure optimum catalytic activity, the support is preferably porous. The catalyst has a pore volume of between 0.001 ml/g and 1000 ml/g, preferably between 0.01 ml/g and 100 ml/g. The specific surface area of the catalyst makes it possible to assess the catalyst's capacity to expose its active sites to the flow of reagents. The specific surface area is expressed in $m^2/g$; the active surface area is between 1 $m^2/g$ and 10,000 $m^2/g$, preferably between 1 $m^2/g$ and 1000 $m^2/g$.

A magnitude, known as the space velocity, may be defined, which relates the flow rate of gas to the amount of solid catalyst. This magnitude may be expressed in $Nm^3/m^3/h$ or in kg/kg catalyst/h, and is between 0.01 kg/kg/h and 1000 kg/kg/h, preferably between 0.1 kg/kg/h and 100 kg/kg/h.

The process is useful for reducing the oxygen content from 100 ppm to less than 5 ppm and advantageously to less than 1 ppm and more particularly from 30 ppm down to 0.2 ppm or 0.8 ppm.

The process may be performed at any pressure, which has no effect on such small contents. The advantage of a high pressure is that the apparatus for placing the VF2 in contact with the catalyst is more compact. The pressure at which the VF2 to be deoxygenated is available is usually used.

As regards the temperature, it may be between 0° C. and 200° C. However, it is advantageously between 50° C. and 100° C.

Preferentially, the element is copper. When the element is copper, the removal of oxygen is based on the following chemical equations:

$$2Cu + O_2 \rightarrow 2CuO$$

$$4Cu + 2O_2 \rightarrow Cu_2O$$

The removal of oxygen is carried out by simply passing the monomer(s) through a cartridge. The catalyst contained in the cartridge is preferably a solid catalyst containing the elements copper or palladium. On the industrial scale, given the larger flow rates by volume of monomer which it is necessary to treat, the cartridge is replaced with apparatus of larger volume. This may be, for example, a column or an assembly of two or more columns functioning in series or in parallel. If the columns function in parallel, a step of catalyst regeneration may take place while another column carries out the deoxygenation of the monomer.

Another solution for deoxygenating the monomer consists in combining with the $VF_2$ container a deoxygenating cartridge directly linked to the container. The deoxygenation thus takes place in semi-continuous mode each time the monomer is removed from the container.

This type of catalyst is already known and is used to treat the neutral gases (argon, nitrogen) of laboratory glove boxes. This is necessary, for example, for the handling of organometallic compounds which are oxygen-sensitive (for example organometallic aluminum derivatives). These catalysts are also used to remove the traces of oxygen from gaseous monomers containing only carbon and hydrogen, for example ethylene or propylene. Specifically, in order to polymerize ethylene efficiently using catalysts of Ziegler-Nafta type, it is necessary to have available monomers containing minute traces of oxygen.

The catalyst of the type R3-15 T5x3 sold by BASF® may be mentioned for example.

This deoxygenation is useful in the high-pressure PVDF preparation process described above, but also in the other PVDF preparation processes. Case of the high-pressure polymerization according to the main process of the present invention:

The bulk polymerization of 1,1-difluoroethylene to give PVDF is a polymerization carried out at high pressure, and requires the removal of all traces of oxygen from the fluoro monomer in order to avoid an untimely polymerization in the reactor or even in the pumps during the compression phase. Specifically, the oxygen may act as radical initiator in the same way as the organic radical initiators which are intentionally added to the polymerization medium. The presence of oxygen thus impairs the working of the process and also its safety.

For example, when the bulk polymerization of $VF_2$ is carried out at 1850 bar, it is necessary to inject the equivalent of 7 ppm of pure tert-butyl perpivalate (sold under the reference code LUP 11 by Atofina). However, if the monomer contains 10 ppm of residual oxygen, this is equivalent to an amount of LUP 11 of 54 ppm, i.e. much more than is required to carry out the polymerization. If the oxygen content is lowered to 1 ppm of residual oxygen, the equivalent amount of LUP 11 is 5.4 ppm.

Case of the Emulsion Polymerization

In the case of the emulsion polymerization of $VF_2$, an excessive amount of oxygen may retard the polymerization or even prevent it from taking place. Tests have shown that at and above an oxygen content of 20 ppm, the polymerization is totally inhibited.

When the polymerization of $VF_2$ takes place in emulsion with initiation with ammonium persulphate, chain ends are terminated with fragments of the initiator. These ends are fragile and on heating give sulphuric acid which degrades the polymer. Similarly, the use of percarbonates as initiators leads to the formation of aldehydes as decomposition by-products. These aldehydes may give rise to colorations of the polymer when this polymer is extruded or converted at high temperature. Consequently, PVDF prepared in emulsion is proportionately more stable the lower the amount of initiator required. There is thus a need to reduce the residual oxygen content in order to use as little initiator as possible.

For example, when the emulsion polymerization of VF2 is carried out, 1 g of potassium persulphate per 10 kg of PVDF is frequently used, which is equivalent to $7.7 \times 10^{-7}$ mol of radical anions per gram of PVDF. Now, if the monomer contains 10 ppm of residual oxygen, this is equivalent to a theoretical amount of $4.3 \times 10^{-7}$ mol of O° radicals per gram of PVDF (for a final solids content of about 40%). Without prejudging the inhibition mechanism, it is found that the concentrations are of the same order of magnitude. The potential advantage of having a VF2 containing an amount of residual oxygen of less than 1 ppm, especially for the VF2 added during the polymerization and which does not undergo the initial degassing procedure, may thus be appreciated.

As regards PVDF of high melt flow index, another aspect of the invention relates to the possibility of obtaining PVDFs (or corresponding copolymers) of high melt flow index (MFI). Specifically, it is known that there is a limit to the production of PVDF of high melt flow index by emulsion or suspension processes.

The process disclosed in the present invention is particularly flexible as regards the production of these products of high melt flow index. The expression "melt flow index" means the mass of resin flowing through a die in a given time, at a given temperature and under a given weight. It is thus a fully standardized measurement. In the case of PVDF or its copolymers, the following standard is applied: the measurement is carried out at 230° C., under a 5 kg load, through a die 2.09 mm in diameter. PVDFs with an MFI value of greater than 50, 100, 200 or even 400 g/10 min (at 230° C./5 kg according to ASTM D-1238) are prepared.

The molecular masses are controlled by injecting transfer agents into the reactor. The same transfer agents as for the production of polyethylene may be used. Highly efficient transfer agents exist, which are well known in the processes for producing low-density polyethylene. They are molecules containing labile hydrogen atoms. Mention may be made, for example, of alcohols, aldehydes, in particular propanal or butanal, or even alkanes or alkenes, for example butane, propylene, heptane or isododecane.

These PVDFs of high melt flow index are useful for making coatings. The present invention also relates to, as products, these PVDFs having these MFIs.

As regards PVDF of low crystallinity, the emulsion or suspension processes are carried out in the presence of water, which necessarily limits the polymerization limit temperature. This is generally between 80° C. and 100° C. It is an advantage to be able to work at high pressure, without water, since it is easy to polymerize VF2 at temperatures above 150° C. At these temperatures, the number of defects present in the polymer chains increases, which has an effect on the crystallinity of the polymer and thus also on its melting point. The larger the number of defects, the more the crystallinity decreases and the more the melting point decreases.

The expression "inversion defect" means any combination of the type $-CH_2-CF_2-CF_2-CH_2-$ along the polymer chain (this also being known as the head-head combination as opposed to the head-tail combination of the type $-CH_2-CF_2-CH_2-CF_2-$). The number of defects may be measured by the fluorine NMR. The number of inversion defects is thus generally given as a percentage.

The level of inversion defects may be between 5% and 15% and for example greater than 6 or 7%. The present invention also concerns, as products, these PVDF homopolymers having these levels of inversion defects.

Another way of measuring the crystallinity of the PVDF is to measure the melting point. It is thus an advantage to be able easily to obtain PVDFs with a melting point of less than 162° C. and advantageously between 162 and 135° C. This temperature may be for example 155° C., indeed less than 150 or 145° C. The present invention also concerns, as products, these PVDFs with these melting points.

Another way of measuring the crystallinity of the PVDF is to measure the elastic modulus. In an entirely advantageous manner, it has been noted that the PVDFs prepared under high pressure had low moduli, giving rise to the possibility of using these products in Kynar Flex® applications (that is to say VF2-HFP copolymers). The elastic modulus at 23° C. according to ASTM D-1708 may be of between 1020 and 650 MPa. The modulus may be for example less than 1000, 900, 800 or even 700 MPa. The present invention also concerns, as products, these PVDF homopolymers with these elastic moduli.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all cited applications, patents and publications, and of corresponding French application 00/12191, filed Sep. 26, 2000, is hereby incorporated by reference.

EXAMPLES

High-Pressure Polymerization Examples.

Example 1

The high-pressure polymerization is carried out in a 100 cm³ steel single-zone autoclave reactor equipped with a collecting separator and a stirrer, and thermostatically maintained at 180° C. The reactor is fed continuously with 1,1-difluoroethylene with the aid of two pumps connected in series. The monomer first passes through a cartridge containing a copper catalyst in order to remove all trace of residual oxygen. The 1st pump compresses the monomer from 50 bar to 300 bar and feeds the second pump which brings the pressure from 300 bar to 1850 bar. The flow rate of the monomer is 4400 g/h. Its temperature at the reactor inlet is 74° C. Its oxygen content, measured using an oxymeter, is 0.6 ppm.

A solution of tert-butyl perpivalate (sold as a solution in isododecane by Atofina under the brand name LUP 11-M-75) diluted in heptane is also introduced into the reactor at a flow rate of 41 cm³/h. The flow rate of pure LUP 11 is then, after calculation, $1.5 \times 10^{-2}$ g/h.

On decomposing, the initiator initiates the polymerization of the 1,1-difluoroethylene, which heats up the reaction mixture. The temperature in the reaction mixture is then 199° C. The polymer is subsequently recovered by decompression in expansion vessels. The mass of PVDF recovered makes it possible to determine the polymerization yield. The melt index is measured using a melt indexer at 230° C. under a 5 kg load according to ASTM D-1238.

conversion: 9.4%

MFI [230° C.; 5 kg]=6 g/10 min

The improved production efficiency of the high-pressure process compared with the process in supercritical $CO_2$ may be appreciated by calculating the polymerization rate $R_p$:

$$R_p = \frac{\dot{m}_{VF_2} \times \text{conversion}}{V}$$

with $\dot{m}_{VF_2}$: flow rate by mass of $VF_2$ in g/s

V: volume of the reactor (liters)

For our example:

V=0.1 liter $\dot{m}_{VF_2}$=4400 g/h=1.22 g/s conversion=9.4%

$R_p$=1.15 g/Ls

In the case of the polymerization in $ScCO_2$, the polymerization rate may be calculated in an identical manner on the basis of the examples given in patent WO 98/28351. For example, this gives:

V=0.8 liter $\dot{m}_{VF_2}$=1.9 g/min=0.032 g/s conversion=24%

$R_p$=0.0096 g/L s

The process disclosed in this patent is thus 120 times as fast as the process disclosed in the patent mentioned above.

Example 2

Example 1 is repeated under the following conditions:

pressure=950 bar flow rate of 1,1-difluoroethylene 5.5 kg/h flow rate of LUP 11=41×10⁻² g/h temperature of the reaction mixture=210° C.

conversion=14%

MFI [230° C.; 5 kg]=200 g/10 min melting point=161.3° C.

Example 3

Example 1 is repeated under the following conditions:

pressure=1450 bar flow rate of 1,1-difluoroethylene=5.5 kg/h flow rate of LUP 11=7.4×10⁻² g/h temperature of the reaction mixture=195° C.

conversion=10.8%

MFI [230° C.; 5 kg]=7 g/10 min melting point=158.4° C.

The molecular masses are determined by steric exclusion chromatography in solution in DMF.

Mn=171,000 g/mol

Mw=290,000 g/mol

Mw/Mn=1.7

It will be noted that the polydispersity (1.7) of the polymer produced is lower than that which is generally encountered in the PVDFs commercially available (2–3 instead) and which are produced by emulsion/suspension. The product was evaluated at 23° C. according to ASTM standard D-1708 and compared with the Kynar® 740 grade:

TABLE 1

|  | Example 3 | Kynar 740 |
|---|---|---|
| threshold stress (MPa) | 43 | 54 |
| threshold elongation (%) | 9.0 | 8.3 |
| tensile stress (MPa) | 52 | 47 |
| elastic modulus (MPa) | 932 | 1160 |

It is found that, despite a smaller modulus, the product of Example 3 has mechanical properties (in particular threshold stress) that are comparable with Kynar 740. Kynar® 740 is a PVDF homopolymer.

Example 4

Example 1 is repeated with the following conditions:

pressure=1850 bar flow rate of 1,1-difluoroethylene=4.3 kg/h temperature of the reaction mixture=189° C.

conversion=9.6%

MFI [230° C.; 5 kg]=8 g/10 min melting point=158° C.

Mn=152,000 g/mol

Mw=320,000 g/mol

Mw/Mn=2.1 level of defects (measured by ¹⁹F NMR)=6.6% threshold stress=46 MPa threshold elongation=8.3% tensile stress=45 MPa modulus=1000 MPa

Examples of Deoxygenation

The 1,1-difluoroethylene used feeds a high-pressure polymerization reactor. The monomer is pumped using two high-pressure pumps in series which compress the monomer in two steps: pump 1 from 40 bar to 300 bar, pump 2 from 300 bar to 1900 bar.

The monomer first passes through a cylindrical steel cartridge (dimensions: length 630 cm, diameter 168 cm) containing a copper-based catalyst sold by BASF under the brand name R 3-11 (mass of catalyst: 2000 g). The metal cartridge is surrounded by an electrical system for heating the catalyst. The residual oxygen content at the cartridge inlet and outlet is measured using an EC180 oxymeter from Hermann Moritz, to assess the efficacy of the catalyst.

Example 5 flow rate of 1,1-difluoroethylene: 4500 g/h, i.e. 2.25 kg/h/kg of catalyst temperature of the cartridge: 22° C.

pressure in the cartridge: 40 bar inlet $O_2$ content: 16 ppm outlet $O_2$ content: 15 ppm

Example 6 flow rate of 1,1-difluoroethylene: 4500 g/h, i.e. 2.25 kg/h/kg of catalyst temperature of the cartridge: 50° C.

pressure in the cartridge: 40 bar inlet O₂ content: 16 ppm outlet O₂ content: 0.6 ppm These two examples show that the deoxygenation of 1,1-difluoroethylene can be carried out efficiently and that the efficacy of the catalyst is improved by heating the cartridge.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A continuous process for the manufacture of PVDF homopolymer or copolymer, wherein a comonomer comprises a vinyl group polymerizable by free radicals and at least one fluorine atom, a fluoroalkyl group or a fluoroalkoxy group directly attached to this vinyl group, said process comprising:
    (a) introducing a flow of VF2, optionally the comonomer, and a radical initiator into a reactor maintained at a pressure of 300 bar–3000 bar, the reactor comprising at least 90% by weight VF2, optionally the comonomer, and PVDF;
    (b) removing at least a portion of the reaction mixture from (a) and introducing into a separator;
    (c) recovering molten PVDF in the separator and purging continuously;
    (c1) optionally introducing the flow of PVDF from (c) into a device to make granules; and
    (d) recovering VF2 and optionally the comonomer in the separator and recycling into (a).

2. A process according to claim 1, wherein the proportion of comonomer is 0–50% by weight.

3. A process according to claim 1, wherein the pressure is 1500 bar–2500 bar.

4. A process according to claim 1, wherein the radical initiator is tert-butyl perpivalate.

5. A process according to claim 1, wherein the flow rate of initiator is, by weight, 2 ppm–100 ppm of all of the fresh VF2 or of the fresh VF2 and the fresh comonomer combined.

6. A process according to claim 1, wherein the temperature of the reactor is 50° C.–300° C.

7. A process according to claim 1, wherein the temperature is 90° C.–220° C.

8. A process according to claim 1, wherein a product to promote flow is added to the reactor or at the reactor outlet in an amount of 0–10% by weight relative to the mass of fluoro comonomers and PVDF contained in the reactor.

9. A process according to claim 1, further comprising deoxygenating fresh VF2 and optionally the comonomer before introduction into said reactor, the deoxygenating comprising placing the flow of VF2 and of the optional comonomer in contact with (i) a sufficient amount of a catalyst whose active sites are elements belonging to groups 8 to 11 of the Periodic Table of the Elements and (ii) for a time which is sufficient to obtain the desired oxygen content.

10. A continuous process for the manufacture of PVDF homopolymer or copolymer, said process comprising:
    introducing a flow of VF2, optionally a comonomer comprising a vinyl group polymerizable by free radicals and at least one fluorine atom, a fluoroalkyl group or a fluoroalkoxy group directly attached to this vinyl group, and a radical initiator into a reactor maintained at a pressure of 300 bar–3000 bar, the reactor consisting essentially of VF2, optionally the comonomer, and PVDF;
    removing at least a portion of the reaction mixture form (a) and introducing into a separator;
    recovering molten PVDF in the separator and purging continuously;
    optionally introducing the flow of PVDF from (c) into a device to make granules;
    recovering VF2 and optionally the comonomer in the separator and recycling into (a); and
    deoxygenating fresh VF2 and optionally the comonomer before introduction into said reactor, the deoxygenating comprising placing the flow of VF2 and of the optional comonomer in contact with (i) a sufficient amount of a catalyst whose active sites are elements belonging to groups 8 to 11 of the Periodic Table and (ii) for a time sufficient to obtain the desired oxygen content.

11. A continuous process for the manufacture of PVDF homopolymer or copolymer, comprising introducing a flow of VF2, and optionally a comonomer, into a reactor wherein the reactor contains at least 90% by weight VF2.

12. A process according to claim 1, wherein the reactor comprises no water.

13. A process according to claim 1, wherein the reactor comprises no organic solvent, water or ScCO₂.

14. A process according to claim 1, wherein the flow comprises VF2 and the comonomer.

15. A process according to claim 1, wherein the proportion of comonomer is 0–30% by weight.

16. A process according to claim 14, wherein the comonomer is:
    vinyl fluoride; trifluoroethylene; chlorotrifluoroethylene; 1,2-difluoroethylene; tetrafluoroethylene, hexafluoropropylene; a perfluoro(alkyl vinyl); perfluoro(1,3-dioxole); perfluoro(2,2-dimethyl-1,3-dioxole; a product of a formula $CF_2=CFOCF_2CF(CF_3)OCF_2CF_2X$ where X is $SO_2F$, $CO_2H$, $CH_2OH$, $CH_2OCN$ or $CH_2OPO_3H$; a product of a formula $CF_2=CFOCF_2CF_2SO_2F$; a product of a formula $F(CF_2)_nCH_2OCF=CF_2$ where n is 1, 2, 3, 4 or 5; a product of a formula $R_1CH_2OCF=CF_2$ where $R_1$ is hydrogen of $F(CF_2)_z$ and z is 1, 2, 3, or 4; a product of a formula $R_3OCF=CH_2$ in which $R_3$ is $F(CF_2)_z$ and z is 1, 2, 3, or 4; perfluorobutylethylene; 3,3,3-trifluoropropene; 2-trifluoromethyl-3,3,3-trifluoro-1-propene; or a combination thereof.

17. A process according to claim 1, wherein the residence time is 1–60 minutes.

18. A process according to claim 1, wherein the radical initiator is:
    tert-butyl perpivalate, t-butyl hydroperoxide, cumene hydroperoxide, diisopropylbenzene hydroperoxide, di-t-butyl peroxide, t-butylcumyl peroxide, dicumyl peroxide, 1,3-bis(t-butylperoxy-isopropyl)benzene, acetyl peroxide, benzoyl peroxide, isobutyryl peroxide, bis(3,5,5-trimethyl)hexanoyl peroxide, methyl ethyl ketone peroxide, heptane or isododecane.

19. A process according to claim 1, wherein the flow rate of initiator is, by weight, 2 ppm–1000 ppm of all of the fresh VF2 or of the fresh VF2 and the fresh comonomer combined.

* * * * *

UNITED STATES PATENT AND TRADEMARK OFFICE
CERTIFICATE OF CORRECTION

PATENT NO.    : 6,723,812 B2
DATED         : April 20, 2004
INVENTOR(S)   : Thierry Senninger It is certified that error appears in the above-identified patent and that said Letters Patent is hereby corrected as shown below:

Column 12,
Line 6, "reaction mixture form" should read -- reaction mixture from --.

Signed and Sealed this

Twenty-sixth Day of April, 2005

JON W. DUDAS
*Director of the United States Patent and Trademark Office*